June 14, 1938.                H. R. CRAGO                2,120,488
            REVERSIBLE THERMOSTATIC CONTROL SYSTEM
                    Original Filed March 21, 1936
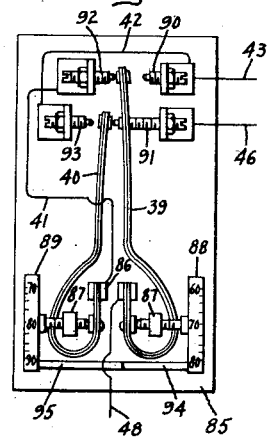
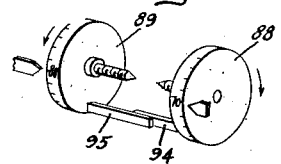
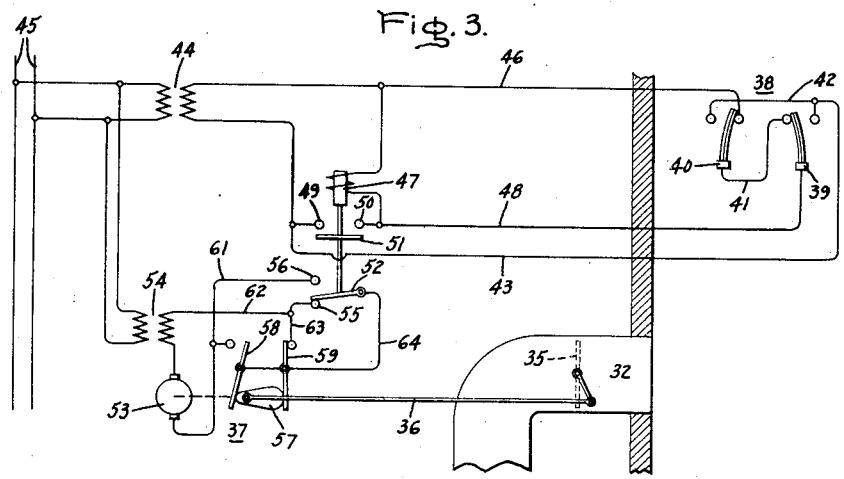
                                        Inventor:
                                     Harry R. Crago,
                               by  Harry E. Dunham
                                     His Attorney.

Patented June 14, 1938

2,120,488

UNITED STATES PATENT OFFICE 2,120,488

REVERSIBLE THERMOSTATIC CONTROL SYSTEM

Harry R. Crago, Verona, N. J., assignor to General Electric Company, a corporation of New York Original application March 21, 1936, Serial No. 70,007. Divided and this application July 21, 1937, Serial No. 154,775

2 Claims. (Cl. 200—139)

This application is a division of my prior application, Serial No. 70,007, filed March 21, 1936.

An object of the present invention is to provide an improved adjustable dual thermostatic control that can be used for both heating and cooling control in year round air conditioning service.

Heretofore it has been the practice to manually change the setting of a single control thermostat so that in the summer time, when the space to be conditioned is cooled, the temperature therein would be maintained at a higher value than it would be in the winter time when the space was being heated. Manual adjustment is also required to change over from cooling to heating control in the widely used central duct systems wherein individual room thermostats control the operation of dampers to regulate the flow of the heat exchange medium through branch ducts to the rooms. In this type of system it is necessary to reverse connections between the control thermostat and the damper actuating means so that the latter will open the damper in heating control to allow the flow of heated medium when the temperature decreases below a predetermined minimum and in cooling control to allow the flow of cooled medium when the temperature rises above a predetermined maximum.

The present invention is an improvement of the inventions on which applications for Letters Patent were filed as follows: Serial No. 70,100 (E. A. Bailey) and Serial No. 70,099 (E. A. Bailey), both filed March 21, 1936, and assigned to the assignee of the present application. In the first of these applications there is disclosed a system utilizing a centrally located thermostat adapted to reverse the connections of thermostats located in the respective rooms to which the heat exchange medium is supplied. In the latter there is disclosed an improved form of device in which a unitary device comprising three thermal responsive means are utilized.

It is an object of the present invention to provide an improved control in which only two thermal responsive means are required, one for heating operation and the other for cooling operation.

A further object of my invention is to provide means whereby the ranges in which the heating and cooling thermostats operate may be adjusted within a predetermined distance from each other but are prevented from overlapping.

A more detailed understanding of the present invention may be secured from the following description taken in connection with the accompanying drawing in which is illustrated a preferred embodiment of the invention. Fig. 1 discloses a plan view of one form of my thermostatic control device provided with means for preventing the two thermal responsive means from operating in overlapping ranges, and Fig. 2 discloses a partial perspective view of Fig. 1. Fig. 3 of the drawing illustrates in schematic diagram a conditioning system using my invention.

The dual thermostatic control shown in Fig. 1 is positioned within the room to be heated or cooled and consists of two thermal responsive elements, which I have illustrated as being of the well-known bimetallic type, indicated by reference numerals 39 and 40. These bimetallic elements are so positioned that they both move toward the right as illustrated in Fig. 1 in response to a decrease in temperature. Consequently, the right-hand contact of the pair of contacts associated with each of elements 39 and 40 may be termed the "low" and the opposite contact, the "high" contact. The high contact of the heating control thermostat 39 is connected to the cooling control thermal responsive element 40 by means of conductor 41. The low contact associated with element 39 is connected with the high contact associated with element 40 through conductor 42 and these are in turn as shown in Fig. 3 connected by conductor 43 to the secondary winding of a transformer 44 through which the thermostats are provided with energy from a suitable source 45. The other terminal of the secondary winding of transformer 44 is connected to the low contact associated with element 40 by means of a conductor 46. It may be seen that if temperature conditions within the space 38 are such as to position the thermal responsive elements in the positions shown then they short circuit the relay 47 through conductors 46 and a conductor 48 leading from one terminal of the relay to element 39. It may be seen further that relay 47 will be energized if element 39 moves into engagement with its low contact on a decrease in temperature below a predetermined value or upon engagement of element 40 with its high contact upon an increase in temperature. Upon energization of relay 47 a holding circuit is established therefor by the closure of contacts 49 and 50 by bridging member 51.

Associated with the relay 47 is a switch member 52 adapted to control the operation of the damper actuating means controlling the admission of heated air in winter and cooled air in summer in a manner that will now be described. The damper 35 is connected by means of a crank arm 36 to the actuating means 37 comprising an electrical motor 53 adapted to receive energy from the supply 45 through a transformer 54. The energization of motor 53 to open and close the damper is effected by means of the switch element 52 and its cooperating contacts 55 and 56 in conjunction with a limit switch mechanism comprising cam 57 and movable switch members 58 and 59. Engagement of switch member 52 with contact 56 upon energization of relay 47 completes a circuit from contact 56 through conductor 61, motor 53, secondary winding of transformer 54, conductors 62 and 63, limit switch 59 and conductor 64 to switch member 52. Motor 53 thereupon operates to open damper 35 by means of a crank arm 36 while at the same time cam 57 is rotated. At the time damper 35 is in its fully open position the cam 57 is rotated 180° to open limit switch 59 and close limit switch 58 thereby deenergizing motor 53. Upon subsequent movement of switch member 52 from contact 56 to contact 55 upon deenergization of relay 47, a circuit is established from contact 55 through conductors 63 and 62, secondary winding of transformer 54, motor 53, conductor 61, limit switch 58 and conductor 64 to switch member 52, thereby energizing motor 53 to return damper 35 to its closed position. Cam 57 again rotates 180° opening limit switch 58 to deenergize motor 53 and closing limit switch 59 preparatory to the next energization of relay 47.

It will be understood that other well known forms of control dampers may be employed if desired. This is particularly true if modulated control of damper 35 is desired and if such modulated control is deemed to be desirable the damper operating motor and control described may be modified in the manner shown in Letters Patent No. 1,902,327—Chester I. Hall, also assigned to the assignee of the present application.

For purpose of illustration I shall assume that it is desirable to supply heated air so as to maintain a minimum temperature of 70° within the room in winter and to supply cooled air so as to maintain a maximum temperature of 80° in summer. Therefore, temperature responsive means 39 is arranged to move to the right into engagement with its right or low contact at a temperature of 70° and thermostat 40 is arranged to move into engagement with its left hand or high contact at a temperature of 80°. It should be understood that these values are merely chosen for purpose of illustration and that the thermal responsive means may be calibrated to operate at any desired temperatures. It will be assumed also that the thermostats will operate with a temperature differential of 2° for purpose of illustration, but it is to be understood that this differential may differ in accordance with the characteristics of various thermostats. Consequently, the differential might be decreased to such a point that the thermostat might be considered as operable from one contact to the other at a particular value of temperature such, for example, as 70° or 80°.

In winter if the temperature within the room decreases to a value below 70°, then thermostat 39 will move into engagement with its right hand or low contact thereby closing an energizing circuit for relay 47 through conductors 46, relay 47, conductor 48, thermal responsive element 39 and conductor 43. Energization of relay 47 effects upward movement of its armature establishing a holding circuit for itself by closure of contacts 49 and 50 by bridging member 51. Simultaneously therewith, switch member 52 is moved into engagement with contact 56 thus effecting energization of motor 53 and causing actuation of damper 35 to its open position. Heated air is then supplied to the room through duct 32.

The supply of heated air is continued until such time as the temperature of the room increases to a value of 72° (since it has been assumed that a differential of 2° is necessary to operate the thermostat) whereupon thermostat 39 moves to the left into engagement with its left hand or high contact to short circuit relay 47 through conductors 46, 41 and 48 in series with thermal responsive elements 39 and 40. The resultant deenergization of relay 47 effects downward movement of its associated armature and switch members 51 and 52, the former opening the relay holding circuit and the latter engaging contact 55 to close an energizing circuit for motor 53 which in turn actuates damper 35 to its closed position in a manner described above.

In summer if the temperature rises to a value above 80° then thermostat 39 will be in engagement with its left contact and thermostat 40 will move into engagement with its left contact to close an energizing circuit for the relay 47 and the latter in turn will effect energization of motor 53 to actuate the damper 35 into its open position to admit cooled air into the room. The above mentioned opening of damper 35 in summer serves to allow the cooled air to be circulated into the room. The circulation of cooled air will continue until such time as the temperature within the space decreases to a value below 78° whereupon the relay 47 is short circuited with the result that switch member 52 engages contact 55 to again energize motor 53 to actuate the damper to its closed position.

To provide against the possibility of operation of both the heating and cooling thermal responsive elements in the same range the thermostatic control device may be constructed after the manner shown in Figs. 1 and 2. In Fig. 1 the device is shown mounted on a suitable base 85 made of insulating material. The base is provided with a pair of fixed supports 86 on which the thermal responsive elements 39 and 40 are mounted.

On the base are a second pair of supports 87 carrying adjusting means 88 and 89. These are provided with right hand screws and rotation of the former in a clockwise direction serves to increase the temperature range in which thermostat 39 operates while rotation of the latter in a clockwise direction serves to decrease the temperature range in which thermostat 40 operates.

The adjusting means 88 and 89 have been provided with a pair of interengaging arms 94 and 95, respectively, to prevent the adjustment of the thermostats to operate in the same temperature range. These arms limit the relative rotation of the adjusting elements.

In operation, it will be apparent from an inspection of Figs. 1 and 2, that rotation of members 88 and 89 in a clockwise direction, as indicated by the arrows, serves to raise the range of operation of thermostat 39 and to lower the range of operation of thermostat 40. The members 88 and 89 are illustrated as adjusted at 70° and 80°, respectively, and it is apparent that they cannot be adjusted to operate at temperatures nearer the 10° as their rotation to operate at nearer ranges is restricted by members 94 and 95. Obviously, this range may be decreased or increased as desired.

The dual thermostatic control described is adapted to various modifications and its advantages will be clearly apparent to those skilled in the art. It is obvious that various types of conditioning systems and damper operating means may be used and, in fact, that the flow of heat exchange medium may be through various types of ducts or pipes and under the control of regulating devices such as valves. It is to be understood that my invention in its broader aspects covers these modifications as well as the one specifically illustrated.

What I claim as new and desire to secure by Letters Patent in the United States is:

1. In combination a pair of adjustably mounted thermal responsive elements, means including a pair of relatively rotatable members for adjusting said elements, and means including a pair of interengaging elements mounted on said rotatable members for limiting the degree of relative rotation of said members.

2. In combination a pair of adjustably mounted thermal responsive elements, a pair of contacts associated with each, means for adjusting the said elements whereby they will engage and disengage said contacts in different temperature ranges, and means cooperating with said last mentioned means for preventing the adjustment of said elements to operate within the same temperature range.

HARRY R. CRAGO.